Patented July 20, 1954

2,684,364

UNITED STATES PATENT OFFICE 2,684,364

OXIDOSTEROIDS AND PREPARATION OF SAME

Eldon M. Jones, Grosse Pointe Woods, Mich., assignor to Parke, Davis & Company, Detroit, Mich., a corporation of Michigan No Drawing. Application March 11, 1950, Serial No. 149,208

16 Claims. (Cl. 260—239.55)

This invention relates to certain new oxidosteroids and to chemical methods for producing same. More particularly, the invention relates to 3-β-hydroxy-Δ⁵-16,17-oxido-20-ketopregnenes which are useful intermediates in the preparation of adrenal cortical hormones, and to a novel process for their preparation.

The 3-β-hydroxy-Δ⁵-16,17-oxidο-20-ketopregnenes of the invention can be represented by the formula,

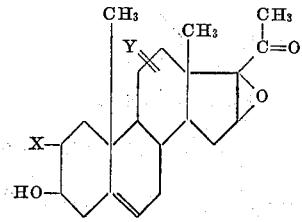

wherein X is hydrogen or hydroxyl, and Y is

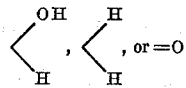

In accordance with the invention, 3-β-hydroxy-Δ⁵-16,17-oxido-20-ketopregnenes of the above general formula are produced by the reaction of a 3-β-hydroxy-Δ⁵,¹⁶-20-ketopregnadiene with hydrogen peroxide. The transformation can be diagrammatically represented as follows:

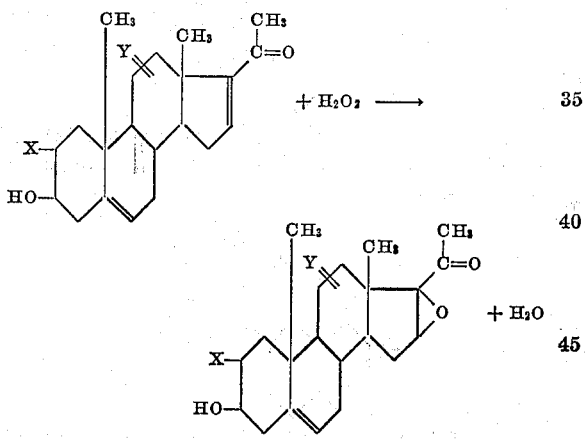

where X and Y have the same significance as given above.

In carrying out the process a polar solvent is employed. The preferred polar solvents are the hydroxylic type such as lower aliphatic alcohols and aqueous mixtures of the same. For best results it is preferable to employ a strongly alkaline catalyst such as an alkali metal hydroxide, an alkaline earth metal hydroxide, an alkali metal carbonate, a quaternary ammonium hydroxide, and the like. The amount of catalyst is not particularly critical since even minute amounts suffice greatly to enhance the rate of the reaction. A modification which can be made in the process consists in the use of an alkali metal peroxide or an alkali metal hydroperoxide. The use of such reagents provides a source both for the hydrogen peroxide and for the alkaline catalyst.

The relative quantities of hydrogen peroxide and the 3-β-hydroxy-Δ⁵,¹⁶-20-ketopregnadiene compound can be varied over rather wide limits, but it is preferable to use not less than about three or four equivalents of hydrogen peroxide for each equivalent of the steroidal starting material. Likewise the temperature can be varied considerably as long as the reaction mixture is, in general, heated sufficiently to effect and maintain complete solution of the steroidal starting material. In most instances, a temperature between about 60° and 100° suffices over which range the reaction is complete within about 20 to 30 minutes.

This invention is illustrated by the following examples.

*Example 1*

A boiling solution of 6.3 g. of 3β-hydroxy-Δ⁵,¹⁶-20-ketopregnadiene in 50 ml. of 95% ethanol is treated with 5 drops of 40% sodium hydroxide and 8.5 ml. of 30% hydrogen peroxide. After boiling for 20 to 30 minutes, the solution is cooled and filtered from the 3β-hydroxy-Δ⁵-16,17-oxido-20-ketopregnene which separates. After recrystallization from 95% ethanol, the product which contains a molecule of alcohol of recrystallization, has a melting point of 194–6°. The solvent of crystallization can be removed from this compound by heating at 100° for 2 hours in vacuo. This compound, which has the formula,

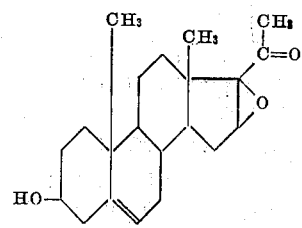

can be characterized as the 3-acetate of melting 2,684,364

3 point 160-2° by treatment with acetic anhydride in pyridine.

Example 2

A hot solution of 100 mg. of 2β,3β-dihydroxy-Δ⁵,¹⁶-20-ketopregnadiene in 10 ml. of 95% ethanol is treated with 1 drop of 40% NaOH, and then with 0.2 ml. of 30% hydrogen peroxide. The solution is boiled for 20 to 30 minutes, and then poured into 300 ml. of ether. The ether solution is washed with water, dried over potassium carbonate and evaporated to dryness. The residue remaining is recrystallized from an acetone-ligroin mixture to give pure 2β,3β-dihydroxy-Δ⁵-16,17-oxido-20-ketopregnene which melts at 206-8° and has the formula,

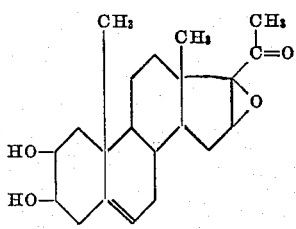

Example 3

A hot solution of 100 mg. of 2β,3β-dihydroxy⁵,¹⁶-12,20-diketopregnadiene in 15 ml. of 95% ethanol is treated with one drop of saturated aqueous barium hydroxide and then with 0.2 ml. of hydrogen peroxide. After refluxing for 20 minutes, the solution is poured into 200 ml. of ether. The ether solution is washed with water, dried over magnesium sulfate, and evaporated to dryness. The residue of 2β,3β-dihydroxy-Δ⁵-16,17-oxido-12,20-diketopregnene of formula,

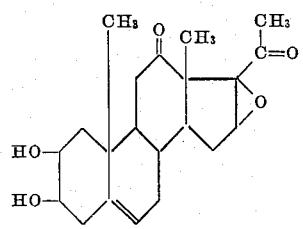

is purified by recrystallization from an acetone-ligroin mixture.

Example 4

A hot solution of 150 mg. of 3β,11β-dihydroxy-Δ⁵,¹⁶-20-ketopregnadiene and 20 ml. of 95% ethanol is treated with 2 drops of 30% aqueous benzyl trimethylammonium hydroxide and then with 0.3 ml. of 30% hydrogen peroxide. After stirring for one hour at 45°, the solution is evaporated in a stream of air and the resulting residue of 3β,11β-dihydroxy-Δ⁵-16,17-oxido-20-ketopregnene of formula,

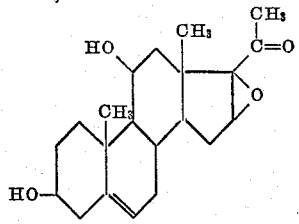

is purified by recrystallization from an ethyl acetate-ligroin mixture.

Example 5

A solution of 70 mg. of 3β-hydroxy-Δ⁵,¹⁶-11,20-diketopregnadiene and 20 ml. of 95% ethanol is treated with 0.1 g. of sodium peroxide and the solution is stirred for one hour at 40°. The pre-

4 cipitate of 3β-hydroxy-Δ⁵-16,17-oxido-11,20-diketopregnene of formula,

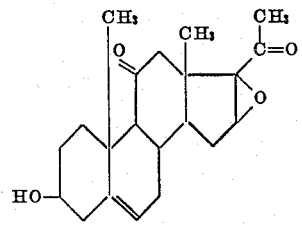

is collected, washed with cold alcohol, and purified by recrystallization from an acetone-ligroin mixture.

What I claim is:

1. A compound of the formula,

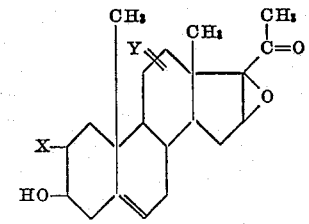

where X is a member of the class consisting of hydrogen and hydroxyl radicals, and Y is a member of the class consisting of

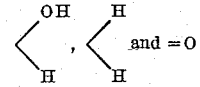

and one of the substituents X and Y being other than hydrogen.

2. 2β,3β - dihydroxy - Δ⁵ - 16,17 - oxido - 20-ketopregnene.

3. 2β,3β - dihydroxy - Δ⁵ - 16,17 - oxido - 12,20-diketopregnene.

4. 3β,11β - dihydroxy - Δ⁵ - 16,17 - oxido - 20-ketopregnene.

5. 3β - hydroxy - Δ⁵ - 16,17 - oxido - 11,20 - diketopregnene.

6. Process which comprises reacting in a polar solvent a 3β-hydroxy-Δ⁵,¹⁶-20-ketopregnadiene of formula,

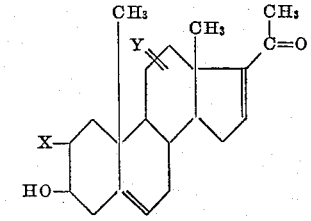

with an excess of hydrogen peroxide to obtain a 3β - hydroxy - Δ⁵ - 16,17 - oxido - 20 - ketopregnene of formula,

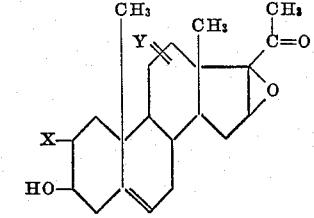

where X is a member of the class consisting of hydrogen and hydroxyl radicals and Y is a member of the class consisting of

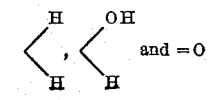

7. Process according to claim 6 wherein the reaction is carried out in the presence of a strongly alkaline catalyst.

8. Process according to claim 6 wherein the reaction is carried out in the presence of sodium hydroxide.

9. Process for producing $3\beta$-hydroxy-$\Delta^5$-16,17-oxido-20-ketopregnene comprising reacting in a polar solvent $3\beta$-hydroxy-$\Delta^{5,16}$-20-ketopregnadiene with alkaline hydrogen peroxide.

10. Process according to claim 9 wherein the reaction is carried out in the presence of a strongly alkaline catalyst.

11. Process according to claim 9 wherein the reaction is carried out in the presence of sodium hydroxide.

12. The process for producing a $3\beta$-hydroxy-16,17-oxido-20-keto-5-pregnene comprising reacting in a polar solvent a $3\beta$-hydroxy-20-keto-$\Delta^{5,16}$-pregnadiene with hydrogen peroxide in the presence of a strongly alkaline catalyst.

13. Process for producing $2\beta,3\beta$-dihydroxy-$\Delta^5$-16,17-oxido-20-ketopregnene comprising reacting in a polar solvent $2\beta,3\beta$-dihydroxy-$\Delta^{5,16}$-20-ketopregnadiene with hydrogen peroxide.

14. Process for producing $2\beta,3\beta$-dihydroxy-$\Delta^5$-16,17-oxido-12,20-diketopregnene comprising reacting in a polar solvent $2\beta,3\beta$-$\Delta^{5,16}$-12,20-diketopregnadiene with hydrogen peroxide.

15. Process for producing $3\beta,11\beta$-dihydroxy-$\Delta^5$-16,17-oxido-20-ketopregnene comprising reacting in a polar solvent $3\beta,11\beta$-dihydroxy-$\Delta^{5,16}$-20-ketopregnadiene with hydrogen peroxide.

16. Process for producing $3\beta$-hydroxy-$\Delta^5$-16,17-oxido-11,20-diketopregnene comprising reacting in a polar solvent $3\beta$-hydroxy-$\Delta^{5,16}$-11,20-diketopregnadiene with hydrogen peroxide.

References Cited in the file of this patent

UNITED STATES PATENTS

| Number | Name | Date |
|---|---|---|
| 2,323,277 | Miescher | June 29, 1943 |